United States Patent
Beymer et al.

(10) Patent No.: US 9,349,105 B2
(45) Date of Patent: May 24, 2016

(54) MACHINE LEARNING WITH INCOMPLETE DATA SETS

(71) Applicant: International Business Machines Corporation, Armonk, NY (US)

(72) Inventors: David J. Beymer, San Jose, CA (US); Karen W. Brannon, Palo Alto, CA (US); Ting Chen, Sunnyvale, CA (US); Moritz A. W. Hardt, Menlo Park, CA (US); Ritwik K. Kumar, Sunnyvale, CA (US); Tanveer F. Syeda-Mahmood, Cupertino, CA (US)

(73) Assignee: International Business Machines Corporation, Armonk, NY (US)

(*) Notice: Subject to any disclaimer, the term of this patent is extended or adjusted under 35 U.S.C. 154(b) by 240 days.

(21) Appl. No.: 14/133,193

(22) Filed: Dec. 18, 2013

(65) Prior Publication Data

US 2015/0170055 A1 Jun. 18, 2015

(51) Int. Cl.
*G06F 15/18* (2006.01)
*G06N 99/00* (2010.01)

(52) U.S. Cl.
CPC .................................. *G06N 99/005* (2013.01)

(58) Field of Classification Search
USPC .......................................................... 706/12
See application file for complete search history.

(56) References Cited

U.S. PATENT DOCUMENTS

| 6,728,716 | B1* | 4/2004 | Bhattacharya .... G06F 17/30067 |
| 6,789,070 | B1 | 9/2004 | Willett et al. |
| 7,494,753 | B2* | 2/2009 | Chen ....................... G03F 1/144 430/30 |
| 7,836,356 | B2* | 11/2010 | Haas ..................... G06F 11/008 714/47.1 |
| 8,332,343 | B2 | 12/2012 | Zhong et al. |
| 8,744,152 | B2* | 6/2014 | Beymer ................ G06T 3/4053 375/240.08 |
| 8,750,375 | B2* | 6/2014 | Beymer ................ G06T 3/4053 375/240.08 |
| 9,008,393 | B2* | 4/2015 | Beymer ................ G06T 7/0085 382/130 |
| 9,053,551 | B2* | 6/2015 | Beymer ................ G06T 7/0085 |
| 2013/0036082 | A1 | 2/2013 | Natarajan et al. |

OTHER PUBLICATIONS

Adaptive kernel learning for detection of clustered microcalcifications in mammograms, Chang Yao; Yongyi Yang; Houjin Chen; Tao Jing; Xiaoli Hao; Hongjun Bi Image Analysis and Interpretation (SSIAI), 2012 IEEE Southwest Symposium on Year: 2012 pp. 5-8, DOI: 10.1109/SSIAI.2012.6202439 Referenced in: IEEE Conference Publications.*

Multiview point cloud kernels for semisupervised learning [Lecture Notes] Rosenberg, D.; Sindhwani, V.; Bartlett, P.L.; Niyogi, P. Signal Processing Magazine, IEEE Year: 2009, vol. 26, Issue: 5 pp. 145-150, DOI: 10.1109/MSP.2009.933383 Referenced in: IEEE Journals & Magazines.*

(Continued)

*Primary Examiner* — Michael B Holmes
(74) *Attorney, Agent, or Firm* — Nolan M. Lawrence; Daniel E Johnson (57) ABSTRACT

Machine learning solutions compensate for data missing from input (training) data and thereby arrive at a predictive model that is based upon, and consistent with, the training data. The predictive model can be generated within a learning algorithm framework by transforming the training data to generate modality or similarity kernels. Similarity values can be generated for these missing similarity values.

19 Claims, 7 Drawing Sheets

(56) References Cited

OTHER PUBLICATIONS

Prediction of coke mechanical strength based on support vector machines Lv Qing; Xie Keming; He Xiaogang; Xie Jun Computer Communication Control and Automation (3CA), 2010 International Symposium on Year: 2010, vol. 1 pp. 35-37, DOI: 10.1109/3CA. 2010.5533812 Referenced in: IEEE Conference Publications.*

Multi-kernel linear programming support vector regression with prior knowledge Jinzhu Zhou; Na Li; Liwei Song Neural Networks (IJCNN), 2014 International Joint Conference on Year: 2014 pp. 1416-1423, DOI: 10.1109/IJCNN.2014.6889369 Referenced in: IEEE Conference Publications.*

MultiK-MHKS: A Novel Multiple Kernel Learning Algorithm Zhe Wang; Songcan Chen; Tingkai Sun Pattern Analysis and Machine Intelligence, IEEE Transactions on Year: 2008, vol. 30, Issue: 2 pp. 348-353, DOI: 10.1109/TPAMI.2007.70786 IEEE Journals & Magazines.*

Shared Kernel Information Embedding for discriminative inference Sigal, L.; Memisevic, R.; Fleet, D.J. Computer Vision and Pattern Recognition, 2009. CVPR 2009. IEEE Conference on Year: 2009 pp. 2852-2859, DOI: 10.1109/CVPR.2009.5206576 IEEE Conference Publications.*

Margin-constrained multiple kernel learning based multi-modal fusion for affect recognition Shizhi Chen; Yingli Tian Automatic Face and Gesture Recognition (FG), 2013 10th IEEE International Conference and Workshops on Year: 2013 pp. 1-7, DOI: 10.1109/FG. 2013.6553810 IEEE Conference Publications.*

Kernel Null Space Methods for Novelty Detection Bodesheim, P.; Freytag, A.; Rodner, E.; Kemmler, M.; Denzler, J. Computer Vision and Pattern Recognition (CVPR), 2013 IEEE Conference on Year: 2013 pp. 3374-3381, DOI: 10.1109/CVPR.2013.433 IEEE Conference Publications.*

Abernethy et al. "A New Approach to Collaborative Filtering: Operator Estimation with Spectral Regularization" Journal of Machine Learning Research 10 803-29, 2009, pp. 803-826. http://dl.acm.org/citation.cfm?id=1577069.1577098&coll=DL&dl=GUIDE&CFID=322469583&CFTOKEN=71472649.

Candes et al., "Exact Matrix Completion via Convex Optimization," Foundations of Computational Mathematics, 2009, pp. 717-772. http://statweb.stanford.edu/~candes/papers/MatrixCompletion.pdf.

Cortes et al., "Support-Vector Networks," Machine Learning 20, pp. 273-297, © 1995 Kluwer Academic Publishers, Boston. http://image.diku.dk/imagecanon/material/cortes_vapnik95.pdf.

Cristianini et al., "On Kernel-Target Alignment," NIPS, 2002, pp. 367-373. http://research.microsoft.com/en-us/um/people/manik/projects/trade-off/papers/CristianiniNIPS01.pdf.

Dick et al., "Learning from Incomplete Data with Infinite Imputations", IMCL '08 Proceedings of the 25th International Conference on Machine Learning, 2008, pp. 232-239. ACM New York, NY, USA © 2008 http://dl.acm.org/citation.cfm?id=1390156.1390186&coll=DL&dl=GUIDE&CFID=322469583&CFTOKEN=71472649.

Fatukasi et al., "Estimation of Missing Values in Multimodal Biometric Fusion", 2nd IEEE International Conference on Biometrics: Theory, Application and Systems, 2008. pp. 1-6. © 2008 IEEE. http://ieeexplore.ieee.org/stamp/stamp.jsp?tp=&arnumber=4699350.

Gonen et al., "Multiple Kernel Learning Algorithms," Journal of Machine Learning Research 12, 2011, pp. 2211-2268, Copyright 2011 Mehmet Gonen and Ethem Alpaydin. http://users.ics.aalto.fi/gonen/files/gonen_jmlr11_paper.pdf.

Kumar et al., "Maximizing All Margins: Pushing Face Recognition with Kernel Plurality," 2011 IEEE International Conference on Computer Vision, Nov. 6-13, 2011, pp. 2375-2382, Barcelona. D.O.I. 10.1109/ICCV.2011.6126520.

Kumar et al., "Multiple Kernel Completion and its Application to Cardiac Disease Discrimination," 2013 IEEE International Symposium on Biomedical Imaging: From Nano to Macro, Apr. 7-11, 2013, pp. 764-767, San Francisco, CA. D.O.I. 10.1109/ISBI.2013. 6556587.

Poh et al., "Adressing Missing Values in Kernel-Based Multimodal Biometric Fusion Using Neutral Point Substitution", IEEE Transactions on Information Forensics and Security, 2010. vol. 5, Issue 3, pp. 461-469. http://ieeexplore.ieee.org/stamp/stamp.jsp?tp=&arnumber=5491168.

Syeda-Mahmood et al., "Shape-based Matching of ECG Recordings," 29th Annual International Conference of Engineering in Medicine and Biology Society, Aug. 22-26, 2007, pp. 2012-2018. D.O.I. 10.1109/IEMBS.2007.4352714.

Syeda-Mahmood et al., "Shaped-based Similarity Retrieval of Doppler Images for Clinical Decision Support," 2010 IEEE Conference on Computer Vision and Pattern Recognition, Jun. 13-18, 2010, pp. 855-862, San Francisco, CA. D.O.I. 10.1109/CVPR.2010.5540126.

Tsuda et al., "The em Algorithm for Kernel Matrix Completion with Auxiliary Data," Journal of Machine Learning Research 4 67-81, vol. 4, 2003. pp. 67-81. http://dl.acm.org/citation.cfm?id=945365. 945369&coll=DL&dl=GUIDE&CFID=322469583&CFTOKEN=71472649.

* cited by examiner

|  | Patient #1 | Patient #2 | Patient #3 | Patient #4 | Patient #5 |
|---|---|---|---|---|---|
| Patient #1 | Similar Diagnosis | | | Similar Diagnosis | |
| Patient #2 | | Similar Diagnosis | Similar Diagnosis | | Similar Diagnosis |
| Patient #3 | | Similar Diagnosis | Similar Diagnosis | | Similar Diagnosis |
| Patient #4 | Similar Diagnosis | | | Similar Diagnosis | |
| Patient #5 | | Similar Diagnosis | Similar Diagnosis | | Similar Diagnosis |

FIG. 5

|  | Patient #1 | Patient #2 | Patient #3 | Patient #4 | Patient #5 |
|---|---|---|---|---|---|
| Patient #1 |  | Missing Doppler Similarity |  |  |  |
| Patient #2 | Missing Doppler Similarity | Missing Doppler Similarity | Missing Doppler Similarity | Missing Doppler Similarity | Missing Doppler Similarity |
| Patient #3 |  | Missing Doppler Similarity |  |  |  |
| Patient #4 |  | Missing Doppler Similarity |  |  |  |
| Patient #5 |  | Missing Doppler Similarity |  |  |  |

FIG. 6

|  | Patient #1 | Patient #2 | Patient #3 | Patient #4 | Patient #5 |
|---|---|---|---|---|---|
| Patient #1 | | | Missing EKG Similarity | | |
| Patient #2 | | | Missing EKG Similarity | | |
| Patient #3 | Missing EKG Similarity | Missing EKG Similarity | Missing EKG Similarity | Missing EKG Similarity | Missing EKG Similarity |
| Patient #4 | | | Missing EKG Similarity | | |
| Patient #5 | | | Missing EKG Similarity | | |

FIG. 7

MACHINE LEARNING WITH INCOMPLETE DATA SETS

FIELD

This disclosure relates to machine learning. In particular, it relates to machine learning where input data is missing or incomplete.

BACKGROUND

Machine learning allows for an automated processing system (a "machine"), such as a computer system or specialized processing circuit, to develop generalizations about particular data sets and use the generalizations to solve associated problems by, for example, classifying new data. Once a machine learns generalizations from (or is trained using) known properties from the input or training data, it can apply the generalizations to future data to predict unknown properties.

A particular class of learning algorithms uses a technique that is sometimes called supervised learning. Supervised learning algorithms can be designed to map inputs to desired outputs or labels. Some machine learning algorithms use what is sometimes referred to as the kernel trick. The kernel trick allows for the mapping of observations from a general set S into a new space, without having to compute the mapping explicitly. In this manner the observations will gain (linear) structure in the new space. The observations can be based upon the similarity, distance or affinity between different entities As but one example, Support Vector Machines (SVMs) represent a type of supervised learning algorithms that can use kernels. SVMs are based on the concept of decision planes that define decision boundaries. A decision plane is a hyperplane that separates between a set of objects having different class memberships. The hyperplane can be selected by increasing (or maximizing) margins for an SVM trained with samples from two classes. Samples on the margin are sometimes referred to as the support vectors. Other supervised learning algorithms can also use kernels.

SUMMARY

Aspects of the present disclosure are directed to machine learning, and methods of using, that address challenges including those discussed herein, and that are applicable to a variety of applications. These and other aspects of the present invention are exemplified in a number of implementations and applications, some of which are shown in the figures and characterized in the claims section that follows.

Certain embodiments of the disclosure are directed toward a machine learning technique referred to as Multiple Kernel Completion (MKC). Starting from a set of incomplete and noisy approximation of the true similarity, distance or affinity kernel, MKC obtains a consistent view of data similarity, distance or affinity by completing the kernels and finding their best linear combination, all while improving (e.g., maximizing) the discrimination margin.

In various embodiments of the disclosure, a computer-implemented method is carried out by transforming a set of data containing a plurality of entities mapped to an input space to multiple feature spaces, each feature space corresponding to a respective modality kernel having known similarity, distance or affinity scores between the plurality of entities. Similarity, distance or affinity scores are determined for a subset of the modality kernels that have missing scores as a function of the known scores of the modality kernels. A predictive model is generated by assigning the determined scores to the subset of modality kernels.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments of the invention and do not necessarily limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to machine learning from data sets with missing data, more particular aspects relate to machine learning to diagnose medical conditions. While the present invention is not necessarily limited to such applications, various aspects of the invention may be appreciated through a discussion of various examples using this context.

Embodiments of the present disclosure are directed toward a machine learning solution that compensates for data missing from input (training) data to arrive at a predictive model that is based upon, and consistent with, the training data. For instance, the predictive model can be generated within a framework and be designed for use in classifying received data sets in a manner that is consistent with the training data. Particular aspects are directed toward transforming the training data into multidimensional (feature) space to generate distance, modality or similarity kernels. As a result of the missing data, these kernels can have missing similarity, distance or affinity values. Embodiments are directed toward generating similarity, distance or affinity values for these missing values based on the underlying modality space.

Embodiments of the present disclosure are directed toward avoiding complications with completing the missing data by completing modality kernels. This can be particularly useful where there are fewer missing entries in distance or similarity matrices than in the actual data. In certain instances, data completion may apply a blanket rule for completing many (or all) the missing entries, while working with distance or similarity matrices allows for each matrix to be completed based on its underlying modality space. As discussed herein, the consumer of data vectors—machine learning methods like SVMs—can work with similarity kernels. These aspects can facilitate the completion of similarity matrices while accounting for (e.g., optimizing for) generalization accuracy of these machines.

Consistent with certain aspects of the present disclosure, machine learning can be applied in the context of patient diagnosis. Given a set of patients, a human expert—like a doctor—can make a determination as to whether or not deem certain patients are similar or dissimilar. The determinations made by a doctor can be difficult to automate for a variety of reasons. For instance, it is possible that two patients who are similar based on their diagnoses are dissimilar based solely on their medication history. It is also possible that two patients who are similar based on diagnoses, are incomparable based solely on their diagnostic exams because the two patient underwent different exams. A person is able to look through these inconsistencies, examine the records holistically and make the decisions based on her prior experience and training. Automatic methods, on the other hand, can rely on feature vector representation of samples. Such automated methods can run into trouble when the vectors are incommensurate and have missing values. As discussed herein, based on these feature vectors, a set of similarity graphs, matrices or kernels can still be created. While these kernels maybe incomplete, they remain are self-consistent.

For example, a similarity kernel can be complied among patients based on diagnoses, medication and diagnostic exams. If two patients are incomparable based on their diagnostic exam, the corresponding kernel entry will be left unfilled. Various embodiments are directed toward deriving a single consistent similarity kernel, given similarity graphs or kernels—which are self-consistent but incomplete. Such a similarity kernel or graph can be particularly useful for facilitating the automated prediction of diseases, spotting medical errors, recommending medication regimens and selecting patient cohorts for clinical trial, among numerous other useful applications.

Embodiments of the present disclosure are directed toward a machine learning solution that compensates for data missing from input (training) data to arrive at a predictive model that is based upon, and consistent with, the training data. For instance, the predictive model can be generated within a machine learning framework (such as SVM) and be designed for use in classifying received data sets in a manner that is consistent with the training data. Particular aspects are directed toward transforming the training data into multidimensional (feature) space to generate distance, modality or similarity kernels. As a result of the missing data, these kernels can have missing similarity, distance or affinity values. Embodiments are directed toward generating similarity, distance or affinity values for these missing values based on the underlying modality space.

Certain embodiments are directed toward a computer implemented method for producing a predictive model using machine learning. As used herein, such a computer can include a variety of different computer processing circuits or hardware. The processing circuits or hardware can include, specialized processing circuits, programmable logic and/or a general processor that is specially programmed. A computer is therefore not necessarily limited to a single computer processor, core or even a single physical box. Rather, one or more processing functions can be shared between multiple hardware components and devices.

Consistent with embodiments, a computer can be configured to transform a set of data that contains a plurality of entities mapped to an input space. The transformation maps the set of data to multiple feature spaces that each correspond to a respective modality kernel. The modality kernels can each have known similarity, distance or affinity scores between entities of the plurality of entities. The computer can then determine similarity, distance or affinity scores for a subset of the modality kernels that have missing values. This determination can be carried out using an algorithm that is a function of the known scores of the modality kernels. The computer can then generate a predictive model by assigning the determined scores to the subset of modality kernels and implementing a machine learning algorithm (e.g., by training a SVM). This predictive model can then be used to classify data entities within additional data sets.

A SVM is a classification method that can be designed to deal with high-dimensional data. SVMs can use supervised learning models and algorithms to classify data and to recognize patterns. An SVM can take a set of input data and predict, for each given input or entity, which of two possible classes forms the output. An SVM predictive model can be generated from a set of training entities/examples that have labels which assign them into different categories. An SVM training algorithm can build a predictive model which can then be used to assign new entities into appropriate categories (by assigning labels).

More particularly, an SVM model can be generated by mapping a representation of the entities as points in a (feature) space. For instance, the input data set can be defined in a finite dimensional space where the entities for classification might not be linearly separable in that space. An SVM allows for the entities to be linearly separated once transformed into the feature space. The distance between points in this feature space represents the similarity or affinity value/score. Accordingly, the mapping can be selected to separate entities of respective categories by a distance or gap that is sufficiently large. A hyperplane (or a set of hyperplanes) can be constructed that separates the points in the feature space. This predictive model can be used then predict classification of new entities by first mapping the new entities into that same feature space. The classification can then be predicted based upon the side of the hyperplane that the new entities reside.

Aspects of the present disclosure are directed toward SVM modeling that uses similarity or modality kernels to facilitate the mapping of data into a different (feature) space. In order to reduce processing requirements, the mappings can be selected to ensure that dot products can be computed easily in terms of the variables in the original space. This can be done using a carefully selected kernel function $K(x, y)$. For instance, the hyperplanes in the higher-dimensional space can then be defined as the set of points whose dot product with a vector in that space is constant. While aspects of the present disclosure can be useful in combination with SVMs, the disclosure is not limited to SVMs.

As discussed herein, particular embodiments are directed toward the use of kernel completion algorithms, such as:

$$\max_{\alpha,\beta} \sum_{i=1}^{N} \alpha_i - \frac{1}{2} \sum_{k=1}^{P} \beta_k \langle A \circ Y, K_k \rangle$$

where $$\sum_{i=1}^{N} \alpha_i y_i = 0,$$

$$\sum_{k=1}^{P} \beta_k = 1,$$

$$C \geq \alpha_i \geq 0.$$

As discussed herein, $K_k$ includes completely observed kernel functions. The learned kernel, M, should maintain consistency with the observed/known values as denoted by:

$$\max_{\alpha,\beta,\{M_k\}} \sum_{i=1}^{N} \alpha_i - \frac{1}{2} \sum_{k=1}^{P} \beta_k \langle A \circ Y + \lambda I, M_k \rangle$$

such that $\sum_{i=1}^{N} \alpha_i y_i = 0,$ $$\sum_{k=1}^{P} \beta_k = 1,$$

$$C \geq \alpha_i \geq 0,$$

$$M_k \succeq 0 \, \forall \, k$$

and $$M_k^{ab} = K_k^{ab} \forall \, (a,b) \notin \Omega_{K_k},$$

where $$\Omega_K = \{(a,b): K^{ab} = \ \}.$$

The particulars of these algorithms are discussed in more detail herein.

Various embodiments are designed to account for missing, incomplete or unusable data of an input/training data set (even where the missing data is particularly larger or complex). More particular aspects relate to transforming incomplete training data into a new feature space to create a plurality of modality kernels. These modality kernels have missing similarity or affinity values that result from missing data of the training data. A machine learning structure is then trained by completing the modality kernels according known values and associated discrimination margins in the transformed space(s).

It has been recognized that for many situations there can be far fewer missing data entries in a similarity matrix of multiple modality kernels, then in the underlying training data. For instance, the missing data from the training data could be an entire image bitmap having thousands (or even millions) of individual pixel values or it could be other complex data, such as data obtained from a diagnostic test of a medical patient. Accordingly, it can be prohibitively computationally expensive to try to intelligently complete such missing data. It has also been recognized that attempting to complete missing data using generalizations can result in problems due to the same blanket rule being applied to the missing data. Solutions that complete similarity values can be particularly useful because they operate within their underlying modality space(s). Also recognized is the ability to complete missing values in a manner that maintains consistency with known values (e.g., by optimizing for generalization accuracy of an SVM).

Figure 1:
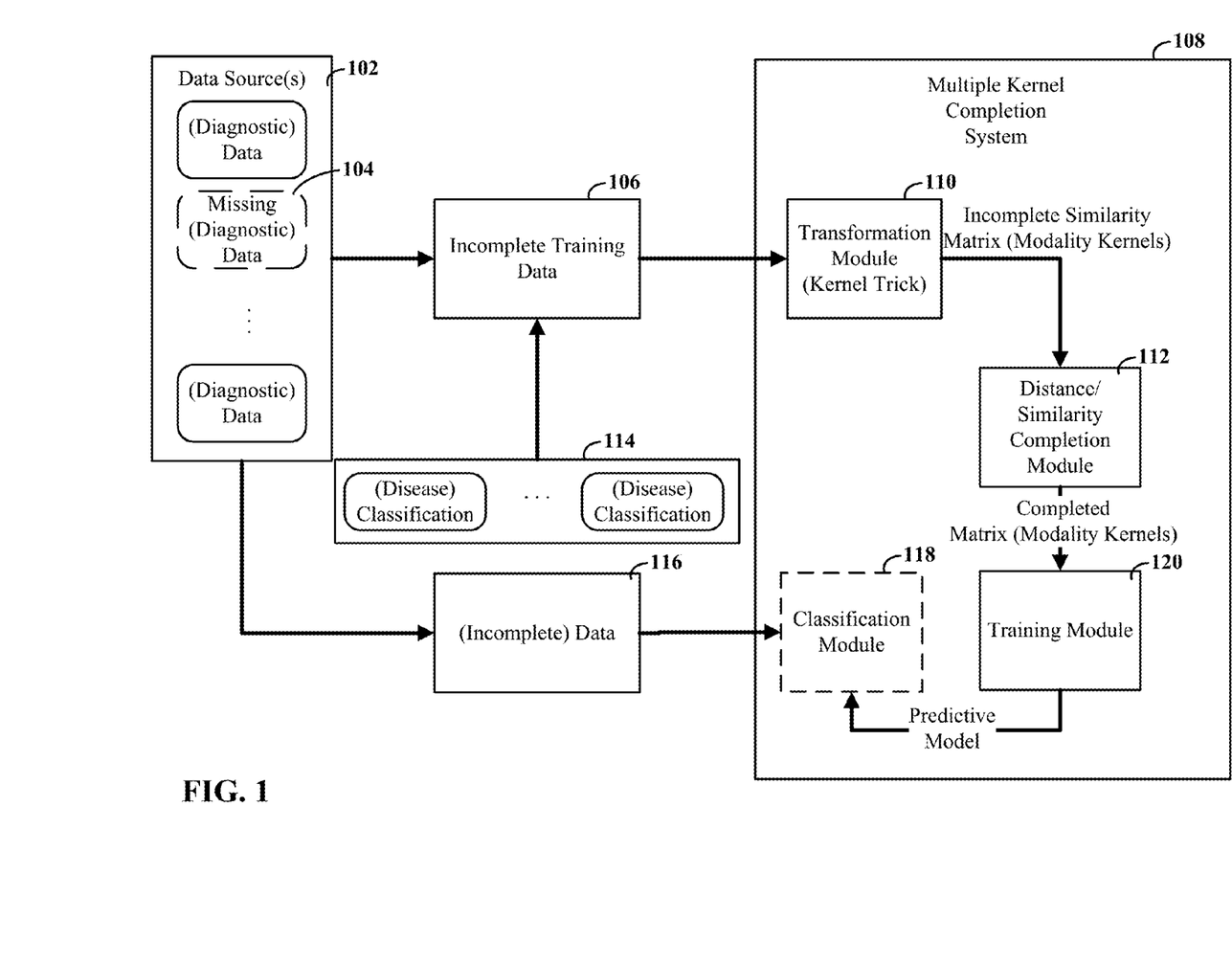
FIG. 1 depicts a system diagram for generating a predictive model, consistent with embodiments of the present disclosure.

Turning now to the figures, FIG. 1 depicts a system diagram for generating a predictive model, consistent with embodiments of the present disclosure. Multiple kernel completion (MKC) system 108 can be configured and arranged to generate a predictive model from incomplete training data 106. Incomplete training data 106 can be provided from data sources 102. Data sources 102 can provide data relevant to a variety of different applications. For instance, the data can be relevant to image processing and classification, gene expression or gene selection (e.g., for cancer treatments), language classification or interpretation, character recognition, geo(spatial) and spatio-temporal environmental data analysis and modeling, or to diagnoses for medical patients. For instance, the data can include diagnostic data for patients, the data having been obtained via one or more medical test procedures.

The data 104 can have missing data entries 104 for particular entities and associated features. The type of data can vary according to the particular application. For medical applications, there can be certain medical patients for whom particular diagnostic test results are unavailable (whether due to not having been run, privacy concerns or other reasons). The type of missing data 104 can vary according to the particular application. As another non-limiting example, the missing data 104 could be in the form of image data.

Incomplete training data 106 can also include classification (label) information 114. For instance, the classification could be a medical diagnosis of a medical condition or disease or it could be a classification of image content or properties. From the classification information, a (ground) truth matrix can be constructed between the data sets from data sources 102 and the assigned labels 114. This can include, for example, labeling a patient's diagnostic test results with a disease that the patient is known to have.

Incomplete training data 106 can be provided in a particular input space. Transformation module 110 can map the training data 106 unto a new (multidimensional) space. In particular embodiments, the transformation can be accomplished using the "Kernel trick," which can facilitate processing in the new/transformed space. For instance, the kernel trick can include the mapping of observations from a general set into an inner product space, without ever having to compute the mapping explicitly. The observations can then gain meaningful linear structure in the inner produce space.

The output of transformation module 110 can be referred to as a similarity, distance or affinity matrix, which can include a number of similarity or modality kernels. The modality kernels can define similarity, distance or affinity between features of the data from data source 102; however, missing data 104 can result in corresponding missing values within the matrix. For instance, similarity values between two patients might not be available in a feature space related to a particular diagnostic test when one patient has no available (or incomplete) test results for the particular diagnostic test.

Distance/similarity completion module 112 can be configured to determine approximate/optimized values for missing similarity, distance or affinity values. This can be accomplished by operating within the known parameters for incomplete training data 106. For instance, the calculations can be optimized for agreement with known parameters. More particular aspects relate to approximating values by selecting values to have reduced or minimal impact on known values, e.g., by optimizing the missing values within a SVM framework and based upon (consistent with) the known values. A few examples of more particular algorithms and related discussions can be found elsewhere within the disclosure.

The determined similarity, distance or affinity values can then be used to complete the matrix, which can then be provided to training module 120. Training module 120 can use the completed matrix to generate predictive model that can be used for predicting unknown labels/classifications from additional data 116. As used herein, the matrix can be completed by providing determined similarity, distance or affinity values for one or more missing values. This does not necessarily preclude instances where some missing similarity, distance or affinity values may not be completed or determined. For example, certain entities with missing values may be excluded from the training based upon objective criteria. The matrix can still be completed with regards to the remaining entities by completing the remaining missing values.

Consistent with certain embodiments, the multiple kernel completion system 108 can include a classification module 118 that is configured and arranged to classify additional data 116 using the predictive model. Other embodiments allow for the predictive model to be provided in a manner that allows other systems to access and use the predictive model.

Figure 2:
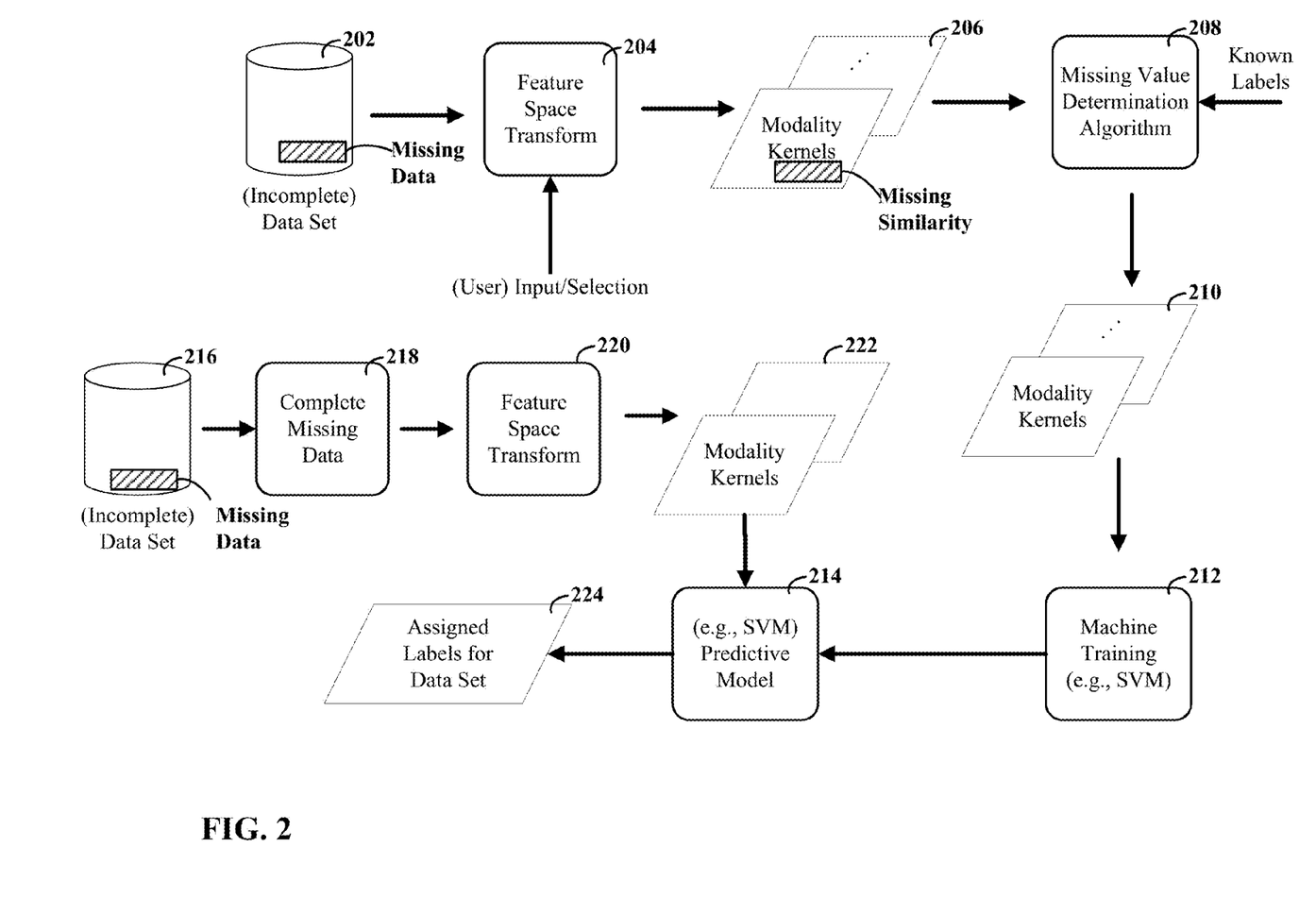
FIG. 2 depicts a block diagram for carrying out a training process with missing data, consistent with embodiments of the present disclosure.

FIG. 2 depicts a block diagram for carrying out a learning machine training process with missing data, consistent with embodiments of the present disclosure. A data set 202 with missing data values can be used to train learning machines, such as an SVM or other learning algorithm. This process can include transforming the data set to a multidimensional feature space (204) to thereby generate a plurality of modality kernels 206. According to embodiments of the present disclosure, the particulars of the transformation can be responsive to various input parameters. For instance, the particular kernel-based transformation can be selected (automatically or by a user) to match the type of data in data set 202 and/or the problem to be solved.

Consistent with embodiments of the present disclosure, modality kernels 206 can include one or more missing similarity, distance or affinity vales. These missing values can correspond to data that was missing from the data set 202. For instance, data set 202 can include data that describes features (e.g., test results) for various entities (e.g., patients), but can also be missing some of this data for a subset of entities. The missing data can thereby cause the modality kernel 206, which describes similarities between data by describing a particular feature, to have missing similarity value(s) corresponding to the missing data.

A missing value determination algorithm 208 can then be applied to determine values for the missing similarities. Consistent with embodiments, this missing value determination algorithm 208 can make a determination within the transformed feature space. As discussed herein, this can be particularly useful for avoiding a need to determine (or fill in) values of data representing complex features. For instance, the missing data may be a digital image with a large number of pixels and/or a large number of possible pixel values. Moreover, this can be particularly useful for completing the missing values in a manner that is meaningful and/or selected to be in accordance with known data.

According to embodiments, the missing value determination algorithm 208 can use known labels and information from other modality kernels to ascertain values that are consistent therewith. For instance, the missing value determination algorithm 208 can use an iterative process to improve the determined values for the missing values relative to known values and the particular machine learning (e.g., SVM) framework. This can be particularly useful for providing values that are optimized (within acceptable bounds) for consistency with known labels and related data.

The determined values can be used to generate completed modality kernels 210, which can be used in training 212. The output or result of the training 212 can include a predictive model 214. The predictive model can be designed to classify additional data 216 based upon feature values within the transformed feature space 220 and corresponding modality kernels 222. Consistent with embodiments of the present disclosure, the additional data 216 can have missing data, which can be completed (218) according to various different methods, some of which are described in more detail herein. The output/result of the predictive model 214 can include assigned (predicted) labels 224 for the data set 216.

Figure 3:
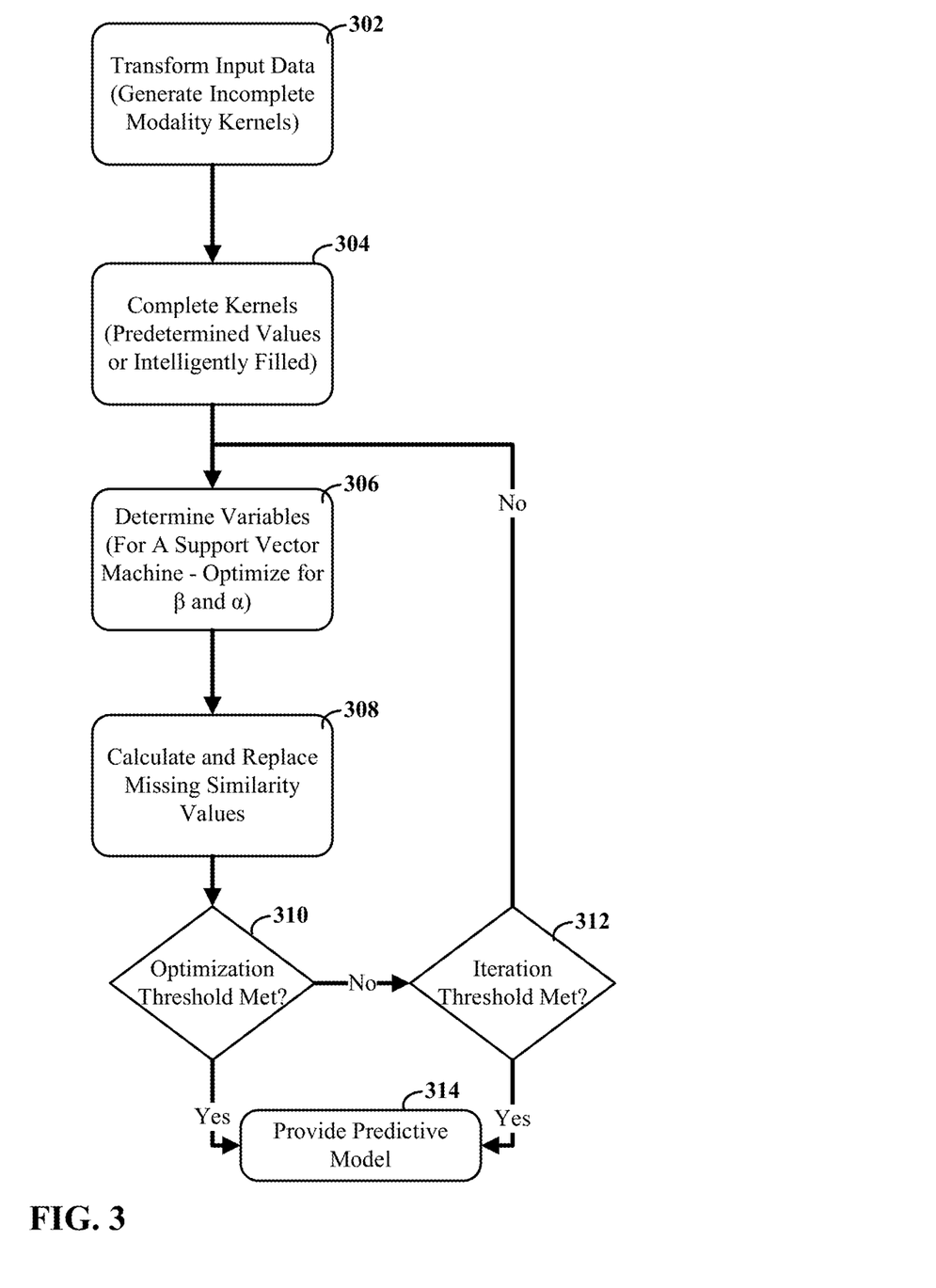
FIG. 3 depicts a flow diagram for carrying out an iterative process of training a supervised learning machine, consistent with embodiments of the present disclosure.

FIG. 3 depicts a flow diagram for carrying out an iterative process of training a learning machine, consistent with embodiments of the present disclosure. A multiple kernel completion system can transform input data into a new multidimensional space, as shown in block 302. This can result in the generation of a plurality of modality kernels, some of which can have missing similarity values. The multiple kernel completion system can then complete the kernel by filling in missing similarity values, as shown by block 304. In certain embodiments, this filling of values can be accomplished using predetermined values (e.g., setting values to zero), or filled using calculated values based upon a more complex algorithm.

The multiple kernel completion system can then determine learning algorithm (SVM) variables using the completed modality kernels, as shown in block 306. This determination can be completed within the appropriate learning algorithm (SVM) framework. For instance, this can include the use of Lagrange multipliers to train a machine based upon the modality kernels.

Using the determined variables, the multiple kernel completion system can then determine values for the missing similarity values based upon the determined SVM variables, as shown in block 308. This determination can be carried out by maintaining consistency with known similarity values and associated labels. Particular embodiments seek to increase or maximize generalized accuracy within the SVM framework and taking into consideration the known similarity values.

Consistent with certain embodiments, the processing associated with blocks 306 and 308 can be repeated until satisfaction of one or more criterion. For instance, the multiple kernel completion system can verify whether or not an optimization threshold has been met, as shown by block 310. This optimization threshold can be based upon, for example, whether or not the improvement from the last iteration is sufficiently small. Other criteria can include an iteration threshold, which can set an upper bound on the amount of processing, as shown by block 312. This iteration threshold can be based upon, as examples, a total number of iterations and/or the total processing time. Once the relevant criteria are met, the multiple kernel completion system can provide a predictive model for use in categorizing future data, as shown by block 314.

Figure 4:
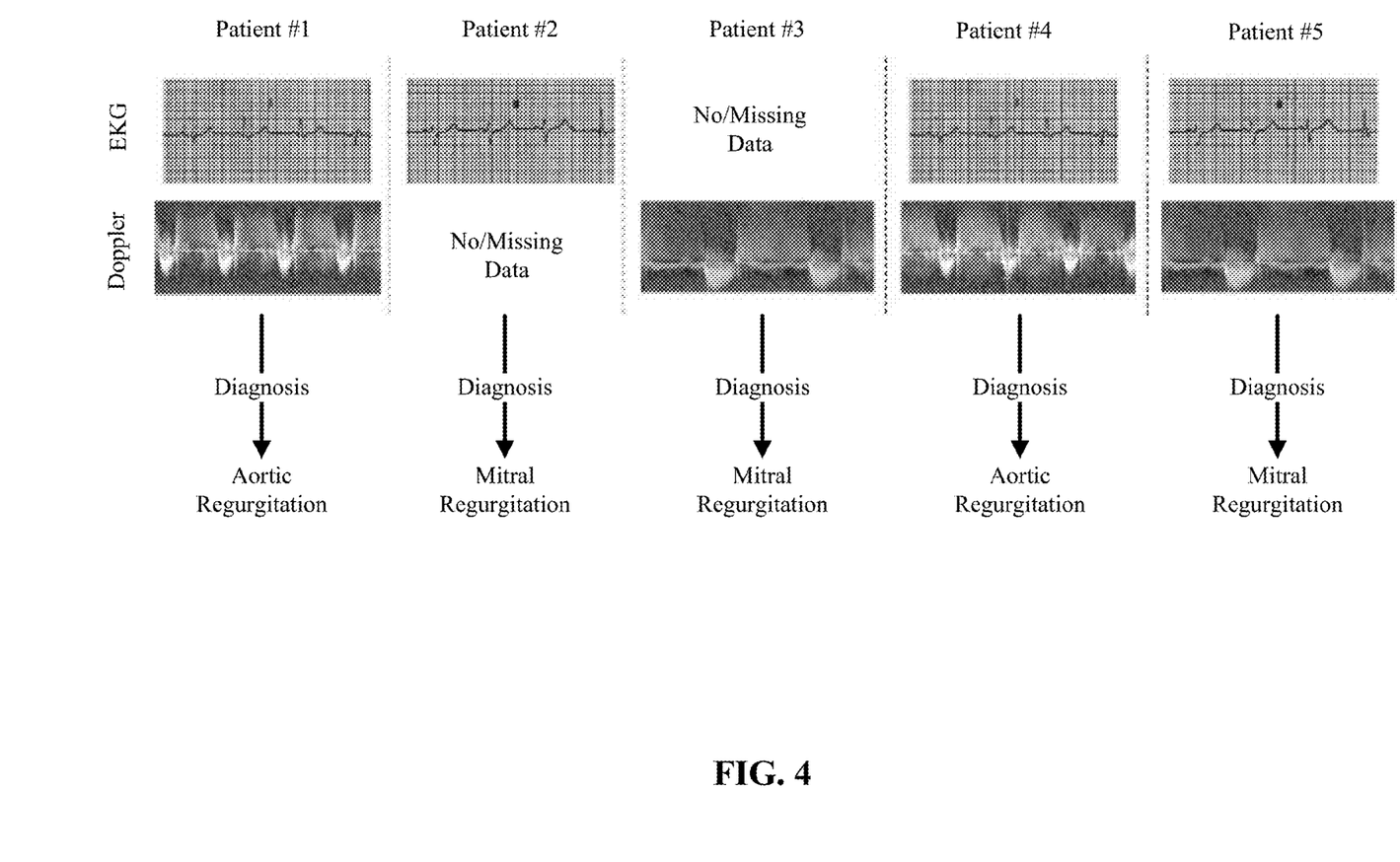
FIG. 4 depicts test results and associated diagnoses, consistent with embodiments of the present disclosure.

FIG. 4 depicts test results and associated diagnoses, consistent with embodiments of the present disclosure. In particular, FIG. 4 shows five patients, their associated electrocardiogram (EKG) and continuous wave (CW) Doppler profiles, as well as their associated diagnoses.

Figure 5:
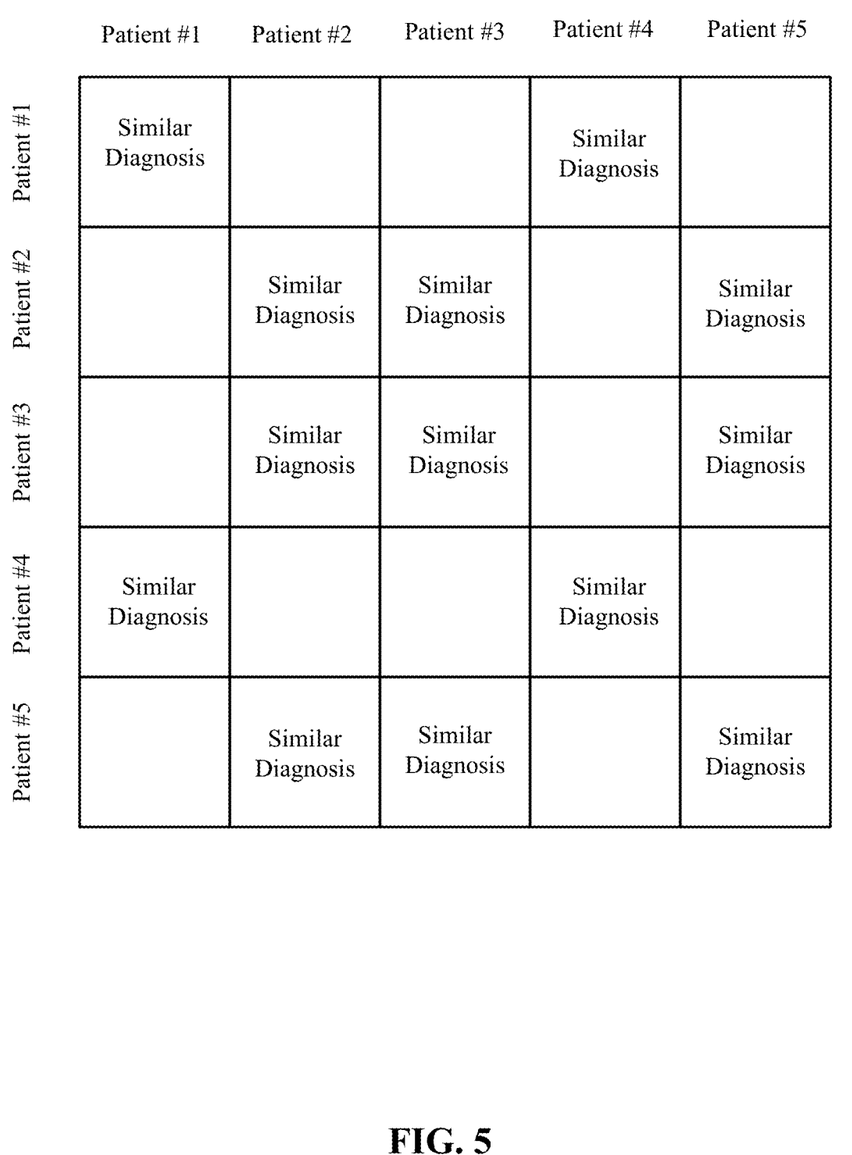
FIG. 5 shows a graphical representation of a ground truth similarity kernel that uses the diagnoses as a training (gold standard) data, consistent with embodiments of the present disclosure.

FIG. 5 shows a graphical representation of a ground truth similarity kernel that uses the diagnoses as a training (gold standard) data, consistent with embodiments of the present disclosure. In particular, the graph of FIG. 5 shows which patients have similar diagnoses.

Figure 6:
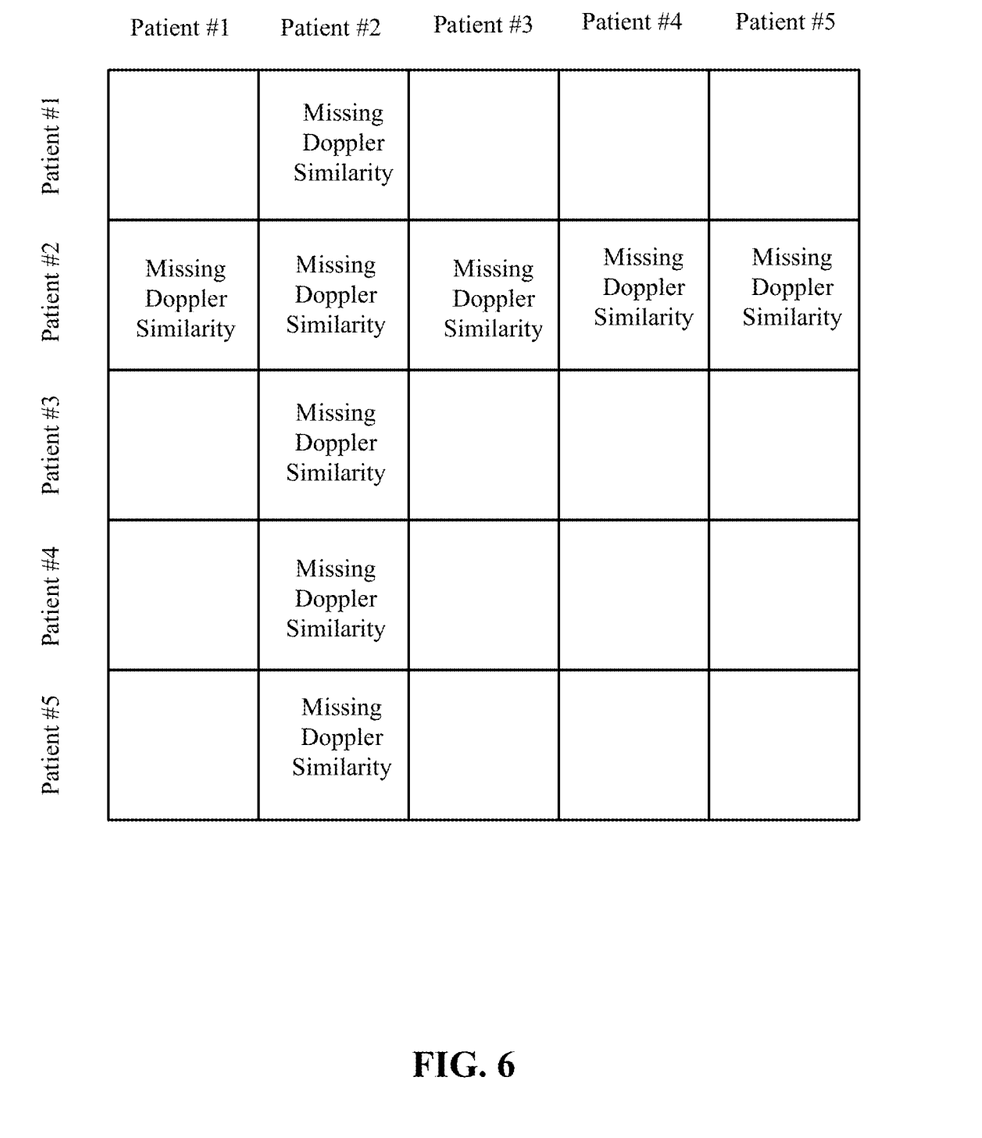
FIG. 6 shows a similarity kernel for EKG measurements, consistent with embodiments of the present disclosure.

FIG. 6 shows a similarity kernel for EKG measurements, consistent with embodiments of the present disclosure. Relying solely on EKG, a similarity kernel can be built; however, the second row and column are missing similarity values because there is no data for patient #2.

Figure 7:
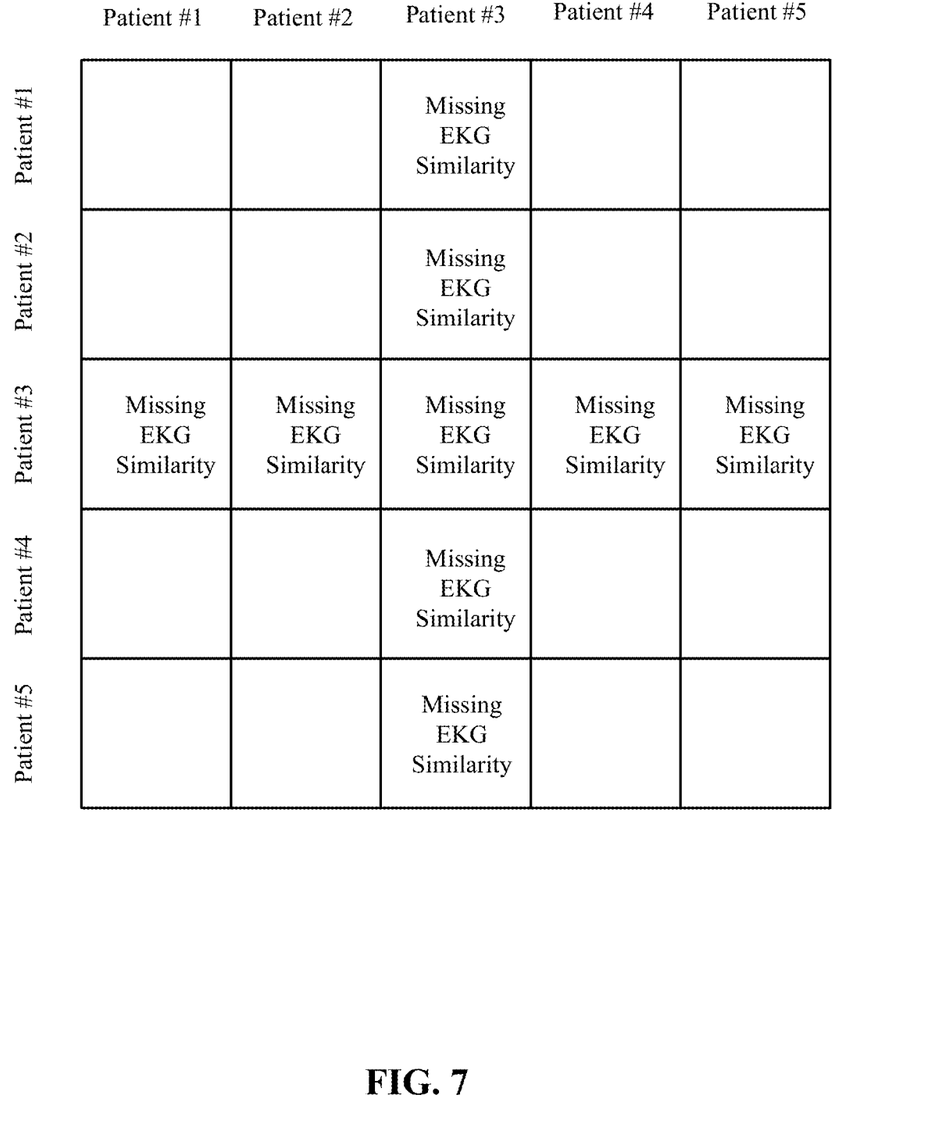
FIG. 7 shows a similarity kernel for CW Doppler measurements, consistent with embodiments of the present disclosure.

FIG. 7 shows a similarity kernel for CW Doppler measurements, consistent with embodiments of the present disclosure. Relying solely on Doppler, another similarity kernel can be built; however, in this case the third row and column are missing similarity values because there are no Doppler measurements for the third patient.

Aspects of the present disclosure are directed toward methods for completing and combining multiple similarity matrices, such as those of the EKG and Doppler derived matrices, in order to derive a matrix that is as close to the ground truth matrix as possible.

One possible solution is to attempt to complete the missing data, in its original space, and then use machine learning to learn similarities based upon the full data set. For instance, missing data can be accounted for by reduced modeling (where missing features are dropped), unique value imputation (e.g., filling in 0), predictive value imputation (e.g., filling in feature mean) and by using more complex algorithms, such as data matrix completion.

Embodiments of the present disclosure are directed toward avoiding complications with completing the missing data by completing modality kernels. This can be particularly useful for several reasons. Firstly, there are often far fewer missing entries in similarity matrices than in the actual data. In the medical example, completing data would involve making up an entire EKG graph for patient #3. Secondly, data completion may apply one blanket rule for completing all the missing entries, while working with similarity matrices allows for each matrix to be completed based on its underlying modality space. Finally, the consumer of data vectors—machine learning methods like SVMs—work with similarity kernels. This makes it possible to complete similarity matrices while accounting for (optimizing for) generalization accuracy of these machines.

Particular embodiments of the present disclosure are directed toward a processor system (e.g., one or more computers) configured to carry out one or more algorithms designed to account for missing data in an SVM environment. The following discussion provides a description of such algorithms. While the specific details provided in this discussion can be useful for understanding of a particular implementation, they are also amenable to a number of variations and changes thereto.

Let $X=\{x_1, x_2, \ldots, x_n\}$, $x_i \ R^d$ be the data set and $y=\{y_1, y_2, \ldots, y_n\}$ be the associated class labels. Let a certain fraction of the data is unknown (denoted by). Formally, let $X=[x_1|x_2|\ldots|x_n]$ be the data matrix and $\Omega_x=\{(i,j):X_{ij}=\}$, the set of locations of unknown matrix values. Given training data set R, $\Omega_R$, with associated class labels yR, an SVM is trained to find similarity between testing data set S (provided with associated $\Omega_S$) and the training data so that class labels for testing data yS can be predicted. Without loss of generality, let ($y_i$ {1, −1}). For each pair $(x_i, x_j)$, let $k_{ij}$ {−1, 1} be the similarity, with 1 meaning similar and −1 meaning dissimilar. The similarity matrix K is defined such that $K^{ij}=k_{ij}=y_i \times y_j$. K $S^{n \times n}$, the space of symmetric positive semi-definite matrices.

A set of similarity kernels $\{K_1, K_2, \ldots, K_P\}$ (modality kernels)—can be derived using R, the incomplete training data. There kernels can be incomplete (thus have associated $\Omega_{Kk}$). The multiple kernel completion can be carried out substantially independently from of the way these kernels are obtained. For purposes of this example, it can be assumed that for every data sample, there is at least one kernel that specifies its similarity to some other data sample. The modality kernels can be calculated using a subset of features from samples. For instance, let $x_i=[a_1|a_2|\ldots|a_P]$ and $x_j=[b_1|b_2|\ldots|b_P]$, then $K_1^{ij}=a_1^T b_1$, $K_2^{ij}=a_2^T b_2$ and so on. If any $a_p$ or $b_p$ is incomplete, the corresponding $K_p$ entry is incomplete.

The complete similarity matrix for R can be modeled as $$K = \sum_{j=1}^{P} \beta_j K_j \quad (1)$$

such that $$\sum_{j=1}^{P} \beta_1 = 1.$$

This restricts the search for complete kernel matrix to the cone of given modality specific kernel matrices. If K is known, it can be used to train an SVM, which can be used to predict labels for S. The dual formulation of SVM objective function is given as $$\max_{\alpha} \sum_{i=1}^{N} \alpha_i - \frac{1}{2} \sum_{i=1}^{N} \sum_{j=1}^{N} \alpha_i \alpha_j y_i y_j K(x_i, x_j) \quad (2)$$

such that $\sum_{i=1}^{N} \alpha_i y_i = 0$ and $$C \geq \alpha_i \geq 0.$$

Here N is the cardinality of R, $\alpha$ is the SVM weight vector and C is the SVM margin slack parameter. By defining $A=\alpha\alpha^T$ and $Y=yy^T$, the above can be compactly written as $$\max_{\alpha} \sum_{i=1}^{N} \alpha_i - \frac{1}{2} \langle A \circ Y, K \rangle, \quad (3)$$

where $$\langle A, B \rangle = \text{trace}(A^T B)$$

and

∘ is the Hadamard product.

At this stage is K is unknown since modality kernels $\{K_j\}$ are incomplete and mixing parameters $\beta=\{\beta j\}$ are unknown. Substituting Eq. 1 in Eq. 3

$$\max_{\alpha, \beta} \sum_{i=1}^{N} \alpha_i - \frac{1}{2} \sum_{k=1}^{P} \beta_k \langle A \circ Y, K_k \rangle \quad (4)$$

such that $$\sum_{i=1}^{N} \alpha_i y_i = 0,$$

$$\sum_{k=1}^{P} \beta_k = 1,$$

$$C \geq \alpha_i \geq 0.$$

If the modality kernels $\{K_p\}$ were complete, the above formulations with unknown $\beta$ can be consistent with what Multiple Kernel Learning is designed to optimize.

Multiple kernel completion, in addition to $\alpha$ and $\beta$, also involves searching for complete $\{K_p\}$. This leads to following dual formulation for the MKC objective function $$\max_{\alpha,\beta,\{M_k\}} \sum_{i=1}^{N} \alpha_i - \frac{1}{2} \sum_{k=1}^{P} \beta_k \langle A \circ Y + \lambda I, M_k \rangle \quad (5)$$

such that $\sum_{i=1}^{N} \alpha_i y_i = 0,$ $$\sum_{k=1}^{P} \beta_k = 1,$$

$C \geq \alpha_i \geq 0,$ $M_k \succeq 0 \; \forall \, k$ and $M_k^{ab} = K_k^{ab} \forall \, (a,b) \notin \Omega_{K_k},$ where $\Omega_K = \{(a,b): K^{ab} = \}.$ The additional constraints, $M_k \succeq 0$, ensures that $M_k$ is a symmetric positive semi-definite matrix and $M_k^{ab} = K_k^{ab}$ enforces that $M_k$ is same as the given modality kernel $K_k$ at locations where $K_k$ is known. Furthermore, the search for Mk can be regularized by adding a term $$1/2 \sum_{k=1}^{P} \beta_k \langle \lambda I, M_k \rangle$$

that ensures that only low rank kernels are admitted. Since a direct minimization of the rank of a matrix (number of non-zero eigenvalues), or its nuclear norm, is not convex, a convex relaxation—trace—is used that is the sum of the eigenvalues. This limits its rank. $\lambda$ is the regularization constant.

Consistent with embodiments, an iterative approach can be used to solve for the unknowns $\alpha$, $\beta$, $M_k$. For instance, $M_k$ can be fixed by setting unknown values to predetermined values (e.g., zeros) or using more complex methods. Equation 5 can then be maximized for $\alpha$, $\beta$. Then, for fixed $\alpha$, $\beta$, $M_k$ can be determined by optimizing $$\min_{\{M_k\}} \sum_{k=1}^{P} \beta_k \langle A \circ Y + \lambda I, M_k \rangle \quad (6)$$

This is a semi-definite program for which efficient solvers can be used. The following pseudo code summarizes such a multiple kernel completion training procedure.

```
    Input:  Training Data: R, Training Labels: y⃗, Modality
            Kernels: {K_i}, i = 1 ... P, Missing value
            locations: {Ω_{K_h}}, λ, termination parameter ε,
            Maximum iterations N_0
    Output: α, β, Completed Kernels {K_i}, i = 1 ... P
1   Complete {K_i} with a traditional method to obtain
    {K_i^0}
2   Y^0 = y⃗^0 y⃗^{0T}
3   for j = 1 : N_0 do
4   |   Using {K_i^{j-1}}, maximize Eq. 4 to obtain α^j, β^j
5   |   A^j = α^j α^{jT}
6   |   Using A^j, Y^0, β^j, λ, minimize Eq. 6 to obtain
    |   {K_i^j}
7   |__ Terminate if (||β^j - β^{j-1}|| < ε)
```

Once an SVM has been trained using incomplete modality kernels, during testing, SVM-based methods can be used to complete testing data S, compute modality kernels using same method as during training and use the learned machine to assign labels to S.

Aspects of the present disclosure can be particularly useful for diagnosing medical diseases from a variety of input data. As non-limiting examples, experimental tests were conducted using different data completion solutions—zero imputation, mean-imputation and Matrix Completion with SVM classifier. These methods are denoted as 0-SVM, m-SVM and mc-SVM respectively. The same data completion techniques were used to initialize MKC training and complete the testing data, leading to 0-MKC, m-MKC and mc-MKC methods. For baseline comparison, results were presented for when no data is assumed missing and an SVM is used F-SVM. All the parameters in MKC—$\lambda$, P, C,—were set using a five-fold cross validation on the training data.

To test the system under controlled setting, the Parkinson's, SPECT and Arrhythmia medical data sets from UCI Machine Learning Repository were used. The protocol randomly removed a fixed fraction of data and then used the above mentioned algorithm to classify the depleted samples. The classification accuracy is shown in Table 1. Tr % is the fraction of data used for training and Ms % is the fraction of data missing. The experiments were repeated 10 times and the mean accuracy was reported. The MKC results were generally superior to the other tested methods for handling missing data across the various training set and missing set sizes. It was also found at times to be nearly equal to the performance realized when no data was missing.

TABLE 1

| Tr % | Ms % | F-SVM | 0-SVM | m-SVM | mc-SVM | 0-MKC | m-MKC | mc-MKC |
|---|---|---|---|---|---|---|---|---|
| Parkinsons (195 samples, 22 features) | | | | | | | | |
| 20% | 20% | 80.3 | 75.9 | 78.1 | 72.6 | 77.0 | 80.7 | 80.7 |
| 20% | 30% | 81.5 | 76.7 | 78.9 | 74.0 | 78.2 | 79.7 | 79.7 |
| 20% | 40% | 81.2 | 74.2 | 74.4 | 71.5 | 75.6 | 78.2 | 78.2 |
| 50% | 20% | 86.0 | 80.2 | 80.0 | 75.5 | 80.8 | 82.4 | 82.4 |
| 50% | 30% | 84.0 | 78.8 | 78.3 | 75.5 | 78.4 | 79.3 | 79.3 |
| 50% | 40% | 83.8 | 78.1 | 79.3 | 75.3 | 78.3 | 80.0 | 80.0 |
| SPECT (267 samples, 22 features) | | | | | | | | |
| 20% | 20% | 76.0 | 72.8 | 71.6 | 79.4 | 79.8 | 77.9 | 77.9 |
| 20% | 30% | 78.0 | 74.1 | 72.1 | 79.4 | 80.1 | 79.8 | 79.8 |
| 20% | 40% | 77.5 | 74.4 | 72.5 | 79.4 | 78.6 | 79.5 | 79.5 |
| 50% | 20% | 80.5 | 78.8 | 77.8 | 79.1 | 79.0 | 79.9 | 79.9 |
| 50% | 30% | 79.1 | 76.2 | 75.4 | 79.1 | 78.6 | 79.1 | 79.1 |
| 50% | 40% | 80.6 | 77.6 | 77.5 | 79.1 | 78.8 | 79.4 | 79.4 |
| Arrhythmia (452 samples, 279 features) | | | | | | | | |
| 20% | 20% | 68.1 | 66.3 | 64.2 | 55.2 | 70.3 | 66.2 | 66.2 |
| 20% | 30% | 67.8 | 65.0 | 62.4 | 56.1 | 66.0 | 62.4 | 62.4 |
| 20% | 40% | 68.0 | 64.2 | 62.4 | 55.0 | 67.4 | 64.3 | 64.3 |
| 50% | 20% | 70.3 | 67.6 | 64.0 | 55.7 | 70.5 | 68.2 | 68.2 |
| 50% | 30% | 69.3 | 66.3 | 65.0 | 56.2 | 70.0 | 67.1 | 67.1 |
| 50% | 40% | 70.5 | 65.7 | 64.3 | 56.3 | 69.8 | 69.2 | 69.2 |

Other experimental tests were carried out on a set of 287 CW Doppler frames and associated valvular disease labels. CW Doppler is a diagnostic technique that can be used to study the flow of blood in and out of heart chambers using sounds wave. The observed velocity patterns can be indicative of the valvular pathology. The velocity patterns can each be associated with pathologies, such as mitral regurgitation, aortic regurgitation, mitral stenosis, aortic stenosis and tricuspid regurgitation. Each of the image frames contained a simultaneously acquired EKG signal which could also be an indicator of pathology.

The SVM was trained to attempt to automatically assign disease labels to a given image frame. Each frame was represented as a vector composed of 4 types of features—upper velocity envelope, lower velocity envelope, upper EKG boundary and lower EKG boundary. The velocity envelope can be obtained using an Otsu-thresholding based method. For EKG extraction, a color based segmentation scheme can be used since EKG was recorded in a different color than the frame background. Image morphological techniques can be used to fill in any gaps in upper and lower EKG curves. The peak from the QRS complex of the EKG can be located by finding the maximum local arc-length of the curve. The QRS peaks can then be used to synchronize the velocity envelope and EKG curve. The velocity features can be normalized across frame by extracting only one heart cycle worth of data from all the frames. Both EKG and velocity curves can be resampled to 100 points.

There can be certain cases on which the velocity envelope and EKG extraction fail. For instance, contributing factors can include the low image SNR, presence of human annotation, and video artifacts. In certain embodiments, failure cases can be automatically detected by looking for envelope-EKG, envelope-boundary and EKG-boundary overlaps. For each of the 287 frames, the four set of features were found along with an indication whether or not the feature extraction succeeded.

Using the five pathologies mentioned above, 10 pairwise binary classification experiments were conducted. The comparison set of methods is same as before, except F-SVM. In its place, err-SVM was. This method uses all available data—even if some features are known to be erroneous. 10% of the data was used for training and rest for testing. The results are shown in Table 2 represent mean accuracy numbers obtained from 10 random splits of data into training and testing sets. The number of missing data varied from case to case.

TABLE 2

| | Ms % | err-SVM | 0-SVM | m-SVM | mc-SVM | 0-MKC | m-MKC | mc-MKC |
|---|---|---|---|---|---|---|---|---|
| MS v. AR | 11.9% | 71.9 | 71.2 | 71.9 | 52.9 | 65.8 | 72.7 | 72.7 |
| MS v. AS | 14.1% | 78.1 | 79.2 | 76.4 | 80.1 | 81.8 | 81.3 | 81.3 |
| MS v. MR | 14.4% | 67.8 | 67.4 | 67.0 | 67.2 | 66.1 | 69.6 | 69.6 |
| MR v. AR | 12.1% | 77.0 | 68.2 | 76.4 | 66.3 | 72.3 | 79.3 | 79.3 |
| MR v. AS | 16.4% | 63.2 | 58.7 | 62.9 | 64.3 | 63.9 | 67.3 | 67.3 |
| AS v. AR | 11.4% | 84.3 | 78.4 | 84.7 | 77.1 | 80.4 | 84.8 | 84.8 |
| TR v. MR | 14.5% | 56.9 | 53.3 | 62.8 | 63.6 | 65.8 | 71.6 | 71.6 |
| TR v. MS | 13.0% | 83.0 | 82.7 | 84.0 | 82.7 | 86.0 | 85.7 | 85.7 |
| TR v. AR | 10.0% | 92.0 | 83.2 | 94.6 | 79.1 | 86.0 | 95.1 | 95.1 |
| TR v. AS | 13.7% | 61.1 | 60.0 | 55.5 | 55.5 | 65.1 | 57.9 | 57.9 |

With regards to Kernel Target Alignment, the objective function in Eq. 6 can be seen as a way to improve (or maximize) the alignment of the modality kernels with the ground truth kernel Y in a weighted fashion. Instead of computing alignment based on all the entries in the kernel, MKC tries to maximize alignment for those columns that correspond to support vectors. This also implies that while completing modality kernels, MKC focuses on those columns which correspond to support vectors and discounts the remaining information in the kernel.

Without being limited by theory, this has efficiency implications since in an SVM, only a sparse set of data samples are chosen to be the support vectors. It has been discovered that after a few iterations, MKC fixes the support vectors—picked from both complete and incomplete columns—and subsequent optimization largely changes the fi and missing values.

The examples discussed in terms of medical applications provide context for particular uses of related embodiments. Other medical applications are also possible, including, but not limited diagnosis of diseases such as cancer. Various embodiments are also directed toward uses of learning algorithms to solve a variety of non-medical problems and their related applications. For instance, the learning algorithm can match products and with potential customers for the products based upon information about the products and potential customers. This information, however, may be incomplete due to a number of different factors.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc. or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Aspects of the present invention are implemented using a variety of processing circuits, logic, communications arrangements and combinations thereof. Particular implementations use one or more specially configured computer processors that execute instructions to perform one or more of the aspects discussed herein. Various portions can be implemented using discrete or combinatorial logic, analog circuitry and using various forms of tangible storage mediums.

The various embodiments described above are provided by way of illustration only and should not be construed to limit the invention. Based upon the above discussion and illustrations, those skilled in the art will readily recognize that various modifications and changes may be made to the present invention without strictly following the exemplary embodiments and applications illustrated and described herein. For example, the methods, devices and systems discussed herein may be implemented in connection with a variety of applications such as those involving image processing, customer behavior modeling, robotics, automation, and the like. The invention may also be implemented using a variety of approaches. Such modifications and changes do not depart from the true spirit and scope of the present invention, including that set forth in the following claims.

Although the present disclosure has been described in terms of specific embodiments, it is anticipated that alterations and modifications thereof will become apparent to those skilled in the art. Therefore, it is intended that, to the extent possible, the following claims be interpreted as covering all such alterations and modifications as fall within the true spirit and scope of the disclosure.

What is claimed is:

1. A computer-implemented method comprising:
transforming a set of data containing a plurality of entities mapped to an input space to multiple feature spaces, each feature space corresponding to a respective modality kernel having known scores between the plurality of entities;
determining scores for a subset of the modality kernels that have missing scores as a function of the known scores of the modality kernels; and
generating a predictive model by assigning the determined scores to the subset of modality kernels.

2. The method of claim 1, wherein determining missing scores includes:
initializing the missing scores to predetermined similarity values, and
determining values for weight vectors and mixing parameters used in a support vector machine.

3. The method of claim 2, further including:
calculating a value for the missing scores using the determined values for the weight vectors and the mixing parameters.

4. The method of claim 1, wherein determining missing scores is consistent with labels provided as input training data that classifies the plurality of entities relative to one another.

5. The method of claim 4, wherein the labels are patient diagnosis, the entities are patients and the scores relate to similarities in features from diagnostic tests.

6. The method of claim 5, further including predicting, using the predictive model, a patient diagnosis for additional entities and associated features from diagnostic tests.

7. The method of claim 4, wherein the labels are products and the entities are potential customers for the products.

8. A system comprising:
one or more computer processor circuits configured and arranged to
transform a set of data containing a plurality of entities mapped to an input space to multiple feature spaces, each feature space corresponding to a respective modality kernel having known scores between the plurality of entities;
determine scores for a subset of the modality kernels that have missing scores as a function of the known scores of the modality kernels; and
generate a predictive model by assigning the determined scores to the subset of modality kernels.

9. The system of claim 8, wherein the one or more computer processor circuits are configured and arranged to determine missing scores by:
initializing the missing scores to predetermined values, and
determining values for weight vectors and mixing parameters used in a support vector machine.

10. The system of claim 9, wherein the one or more computer processor circuits are configured and arranged to calculate a value for the missing scores using the determined values for the weight vectors and the mixing parameters.

11. The system of claim 8, wherein the one or more computer processor circuits are configured and arranged to determine missing scores while maintaining consistency with labels provided as input training data that classifies entities of the plurality of entities based upon similarities between the entities.

12. The system of claim 11, wherein the labels are patient diagnosis, the entities are patients and the scores relate to similar features from diagnostic tests.

13. The system of claim 12, wherein the one or more computer processor circuits are configured and arranged to predict, using the predictive model, a patient diagnosis for additional entities and associated features from diagnostic tests.

14. The system of claim 11, wherein the labels are products and the entities are potential customers for the products.

15. A computer program product for generating a predictive model using machine learning, the computer program product comprising a non-transitory computer readable storage medium having program code embodied therewith, the program code executable by a processing device to perform a method comprising:
transforming, using the processing device, a set of data containing a plurality of entities mapped to an input space to multiple feature spaces, each feature space corresponding to a respective modality kernel having known scores between the plurality of entities;
determining, using the processing device, scores for a subset of the modality kernels that have missing scores as a function of the known scores of the modality kernels; and
generating, using the processing device, a predictive model by assigning the determined scores to the subset of modality kernels.

16. The computer program product of claim 15, wherein determining missing scores includes:
initializing the missing scores to predetermined values, and
determining values for weight vectors and mixing parameters used in a support vector machine.

17. The computer program product of claim 16, wherein the method further comprises:
calculating a value for the missing scores using the determined values for the weight vectors and the mixing parameters.

18. The computer program product of claim 15, wherein determining missing scores is consistent with labels provided as input training data that classifies the entities of the plurality of entities based upon similarities between the entities.

19. The computer program product of claim 18, wherein the labels are patient diagnosis, the entities are patients and the scores relate to similar features from diagnostic tests.

* * * * *